J. A. STEVENSON.
TREATMENT OF FERMENTABLE SUBSTANCES.
APPLICATION FILED NOV. 25, 1911.
1,051,171.
Patented Jan. 21, 1913.
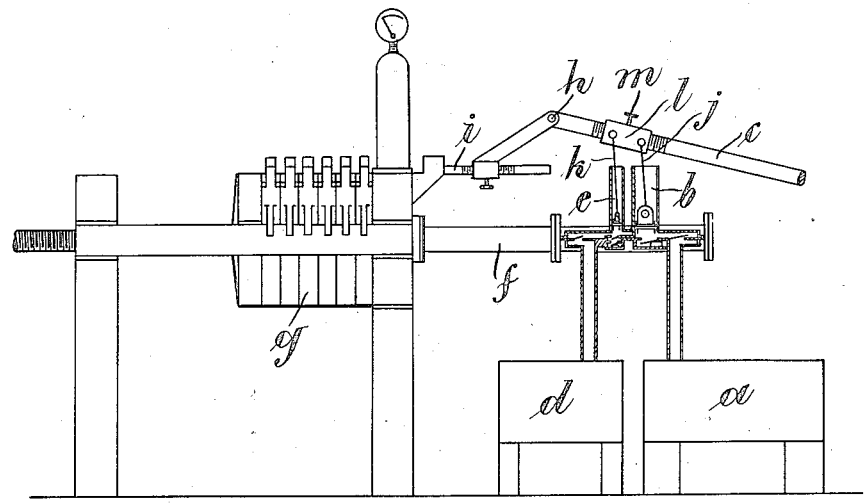
Fig: 1.
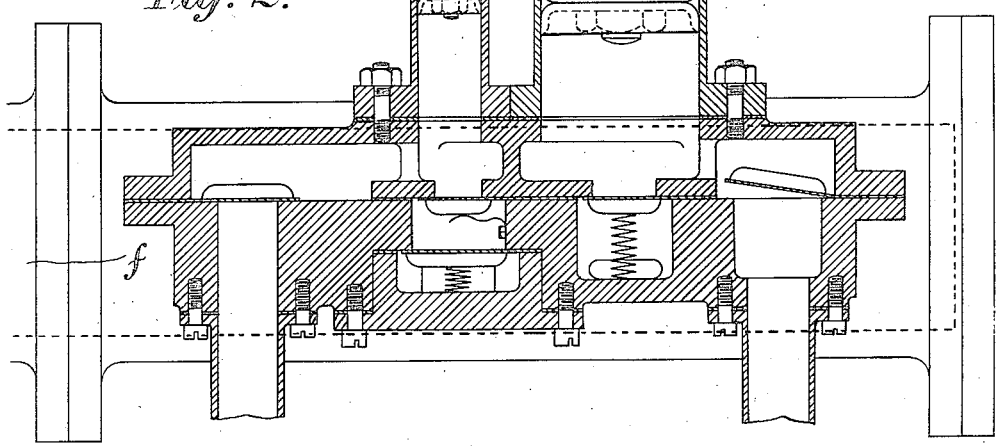
Fig: 2.
WITNESSES:
John C. Sanders
Albert F. Heuman
INVENTOR:
John Atherton Stevenson

UNITED STATES PATENT OFFICE.

JOHN ATHERTON STEVENSON, OF ACTON, ENGLAND.

TREATMENT OF FERMENTABLE SUBSTANCES.

1,051,171.   Specification of Letters Patent.   Patented Jan. 21, 1913.

Application filed November 25, 1911. Serial No. 662,351.

*To all whom it may concern:*

Be it known that I, JOHN ATHERTON STEVENSON, subject of the King of Great Britain and Ireland, residing at 6 Malvern Villas, Acton, W., in the county of Middlesex, England, have invented new and useful Improvements in and Relating to the Treatment of Fermentable Substances, of which the following is a specification.

My invention relates to the treatment of fermentable substances, viz., yeasts of all descriptions or other materials and has for its object the mixing or treatment of such substances in a fluid condition in order to incorporate at once with the fermentable substances any accelerating agent such for instance as sugar, malt extract and the like, which latter increases the fermentability of the mixture when the fermentation is to ultimately take place after the mixture has been put on the market, but which during the time between incorporation and the time of designed ultimate fermentation no operative effect of the accelerating agent can take place.

My invention consists in placing separately under pressure, which may be produced by a double pump or by gases, the fermentable substance and the accelerating agent and delivering them in a proportionate amount into a compressing device adapted to get rid of all the liquid from the compressed substance after the proper compression has taken place, in order that a dry product may be finally obtained which will contain latent fermentability capable of being brought into action under heat and moisture. In order to effect this purpose I may pump two fluids in regulated quantities into a common pipe or receptacle so as to thoroughly mix the same and pass them on to the filter or other liquid extracting device ready for final compression.

The pump may be of a duplex character or of double action so arranged as to deal with each fluid in a regulated manner to give a controlled delivery.

In order that the invention may be the better understood I will now proceed to describe the same in relation to the accompanying drawings, reference being had to the letters and figures marked thereon.

Like letters refer to like parts in which,

Figure 1 is a diagrammatic view partly in section of a double pumping device arranged in conjunction with a filter press. Fig. 2 is an enlarged sectional view of the double pump.

In Figs. 1 and 2 the tank $a$ contains the yeast which is pumped up therefrom by the pump $b$ operated by the lever $c$. The tank $d$ contains the accelerating agent, such as sugar, malt extract and the like, which is pumped up therefrom by the pump $e$ operated also by the lever $c$. Both pumps deliver their charge into the common pipe $f$ leading to the filter press $g$. The pumps $b$ and $e$ are initially proportioned to one another to give substantially the desired proportion but to get a variation within a reasonable range either one side or the other the fulcrum $h$ is adapted to slide upon its support $i$ and to be locked in any suitable position. The pump connecting rods $j$ and $k$ are coupled to a crosshead $l$ which is slidingly mounted on the lever $c$ and is maintained in any desired position by a clamping screw $m$. The support $i$ and the lever $c$ can be marked with corresponding graduations so as to keep the connecting rods $j$ and $k$ in their correct relation to the pump cylinders and to give the respective charges or volumes for the desired proportionate delivery. When the apparatus has been properly adjusted the lever $c$ is operated and the mixture of materials from the tanks $a$ and $d$ is delivered under pressure into the filter press $g$ so that the liquid constituent is expressed and separated from the solid residue which can be removed ready for use when desired.

It is obvious that this divided pump may be used for other materials than fermentable substances in order to make a mixture of them in different proportions.

Having thus fully described my invention, I claim as new and desire to secure by Letters Patent:—

1. Apparatus consisting of the combination of two separate sources of supply, a two cylinder pump, pipes from said separate sources of supply for conveying their contents to the cylinders of said pump, for mixing the same in relative proportions.

2. Apparatus consisting of the combination of two separate tanks, a two cylinder pump, two supply pipes from the said tanks leading to the cylinders of said pumps, the cylinder and plunger of one of said pumps being larger than the cylinder and plunger of the other, a hand lever operating the said plungers simultaneously, adjusting apparatus for modifying the stroke of the said plungers, and a pipe from the delivery valves of the said pumps to carry off the mixed product.

3. Apparatus consisting of the combination of two separate tanks, a two cylinder pump, two supply pipes from the said tanks leading to the cylinders of said pumps, the cylinder and plunger of one of said pumps being larger than the cylinder and plunger of the other, a hand lever and cross head thereon operating the said plungers simultaneously, the said cross head being mounted so as to slide adjustably upon the said lever, a support, an arm adjustably mounted on said support, the said lever being pivoted on said arm, and a pipe from the delivery valves of the said pumps to carry off the mixed products.

In testimony whereof I have signed my name to this specification in the presence of two subscribing witnesses.

JOHN ATHERTON STEVENSON.

Witnesses:
RICHARD A. HOFFMANN,
CHARLES T. R. BULLOUGH.